United States Patent [19]

Rockefeller

[11] 3,952,676

[45] Apr. 27, 1976

[54] DISPENSING CONTAINER MANUFACTURING APPARATUS AND METHODS

[75] Inventor: Winston G. Rockefeller, Woodcliffe Lake, N.J.

[73] Assignee: Colgate-Palmolive Company, New York, N.Y.

[22] Filed: Apr. 16, 1974

[21] Appl. No.: 461,299

Related U.S. Application Data

[62] Division of Ser. No. 308,999, Nov. 24, 1972, Pat. No. 3,832,964.

[52] U.S. Cl. ................................ 113/1 B; 113/7 A; 113/120 D
[51] Int. Cl.² ........................................ B21D 51/36
[58] Field of Search ............. 72/398, 370; 156/203, 156/466; 29/149.5 C; 113/7, 8, 1 B, 120 D

[56] References Cited
UNITED STATES PATENTS

| | | | |
|---|---|---|---|
| 948,551 | 2/1910 | Rigby | 72/398 |
| 1,256,672 | 2/1918 | Forslund | 29/149.5 C |
| 1,850,679 | 3/1932 | Leis | 29/149.5 C |
| 2,158,176 | 5/1939 | Dewey | 72/398 |
| 3,671,360 | 6/1972 | Ochi | 156/466 |
| 3,700,513 | 10/1972 | Haberhauer et al. | 156/203 |

Primary Examiner—C. W. Lanham
Assistant Examiner—E. M. Combs
Attorney, Agent, or Firm—Strauch, Nolan, Neale, Nies & Kurz

[57] ABSTRACT

Collapsible toothpaste and like dispensing containers having flexible body walls and externally threaded discharge necks are formed by wrapping a sheet of flexible material about a mandrel and fastening overlapping side edges together to provide a tubular body shell having a longitudinal seam, and then inserting and clamping one end of the formed body shell between nested mechanically interengaged inner and outer head structure elements.

15 Claims, 48 Drawing Figures

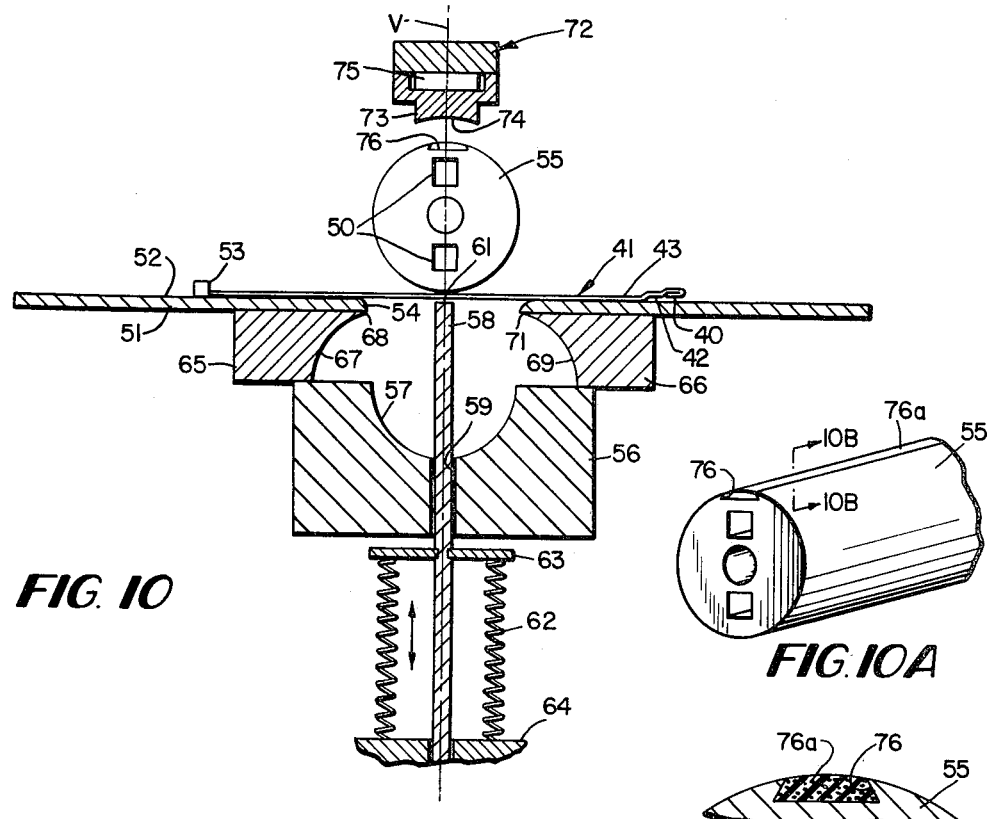
FIG. 10
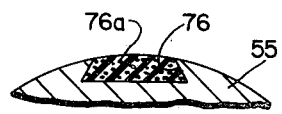
FIG. 10A
FIG. 10B
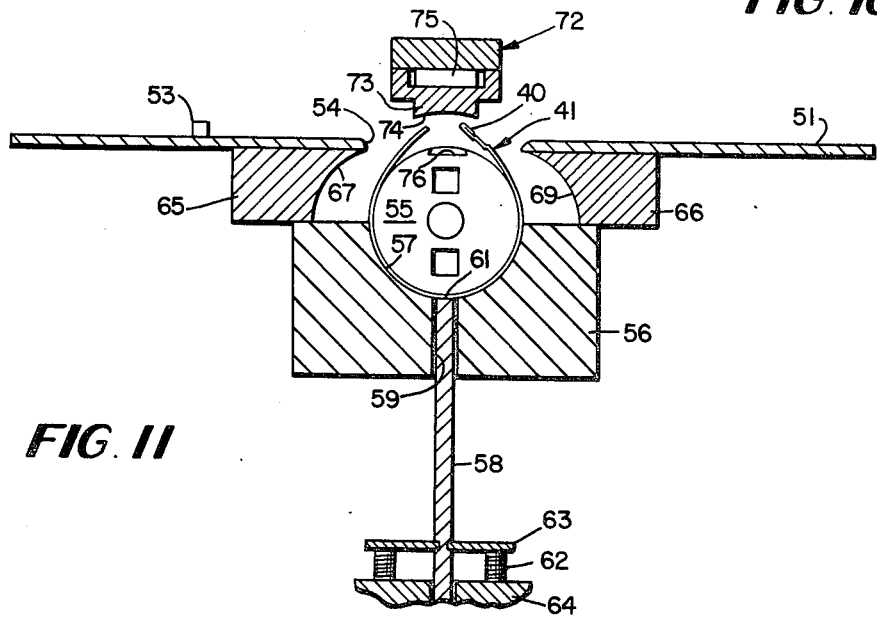
FIG. 11

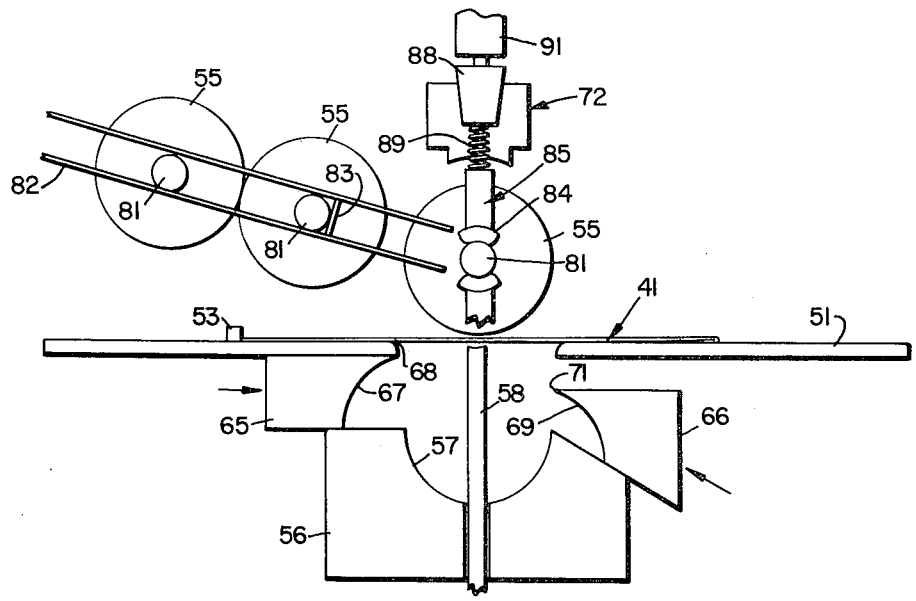
FIG. 16
FIG. 17
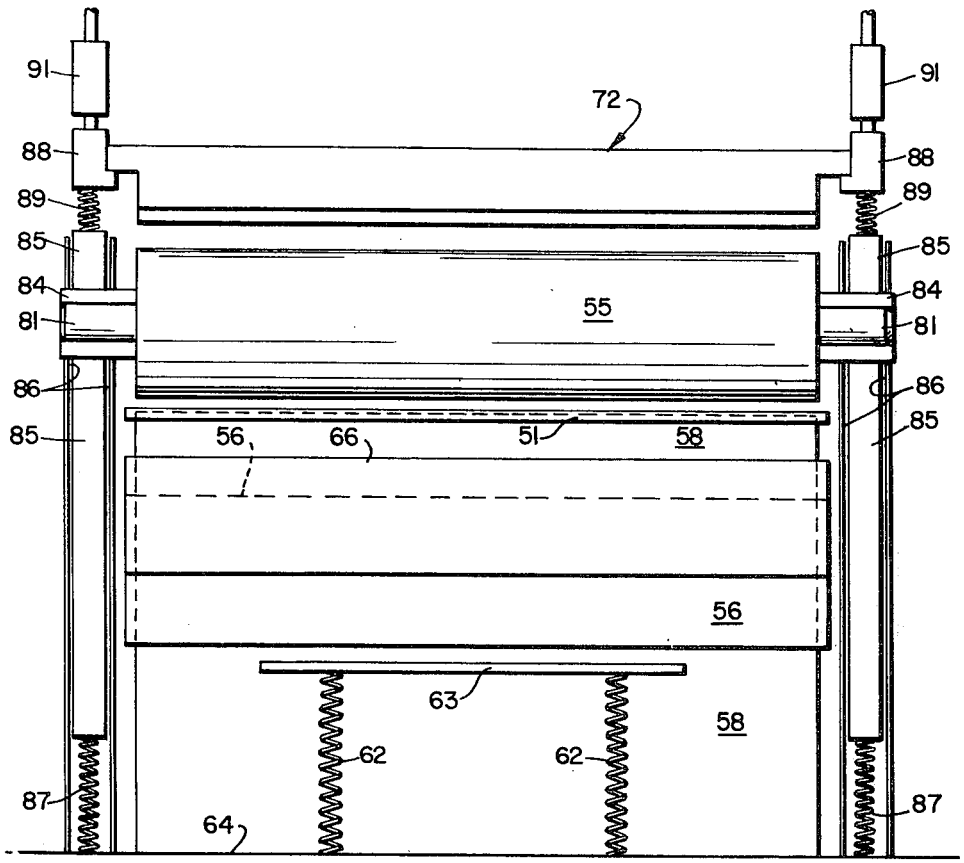

DISPENSING CONTAINER MANUFACTURING APPARATUS AND METHODS

This is a division of application Ser. No. 308,999, filed Nov. 24, 1972, now U.S. Letters Pat. No. 3,832,964, issued Sept. 3, 1974.

This invention relates to the manufacture of flexible walled dispensing containers such as toothpaste and like tubes, and is particularly concerned with special methods and apparatus for forming the tubular bodies of such containers.

An important advantage of the invention is the provision of novel methods and apparatus for making a tubular container body wherein a sheet of flexible bendable material is wrapped around a mandrel with opposite side edges overlapped and secured together along a longitudinal seam.

In a first embodiment of the invention the sheet is wrapped around a relatively non-rotatable mandrel, and in a second embodiment the sheet is wrapped around a rotatable mandrel.

The invention according to the first embodiment provides a novel method and apparatus wherein a mandrel is moved bodily to engage a positioned sheet and displace the sheet into a cooperating die wherein the sheet is conformed between mandrel and die surfaces.

The invention according to the second embodiment provides a novel method and apparatus wherein a mandrel and a coacting sheet moving member are rotated to conform the sheet to the mandrel surface.

A unique advantage of the invention according to both of the foregoing embodiments is the provision of a mandrel grooved to underlie the overlapping side edges of the sheet to minimize external projection along the tube body seam.

A further advantage of the invention is to provide a novel apparatus mounting a mandrel and a seam forming pressure member for sequential operation on the sheet being formed to the tube body.

Further advantages of the invention will appear as the description proceeds in connection with the appended claims and the acompanying drawings.

BRIEF DESCRIPTION OF DRAWINGS

FIG. 10 is an end view in section illustrating apparatus and method for forming the shaped blank into a tube, with the parts in initial condition;

FIG. 10a is a fragmentary end view showing mandrel structure;

FIG. 10b is a section substantially on line 10b—10b of FIG. 10a showing further mandrel structure;

FIG. 11 is an end view in section showing the apparatus and method of FIG. 10 in a a further condition wherein the mandrel has been displaced until the blank is partly wrapped around the mandrel;

FIG. 16 is an end elevation schematically showing stucture for carrying out the tube forming operations of FIGS. 10–15;

FIG. 17 is a side elevation showing further detail of the structure of FIG. 16;

PREFERRED EMBODIMENTS

Figure 1:
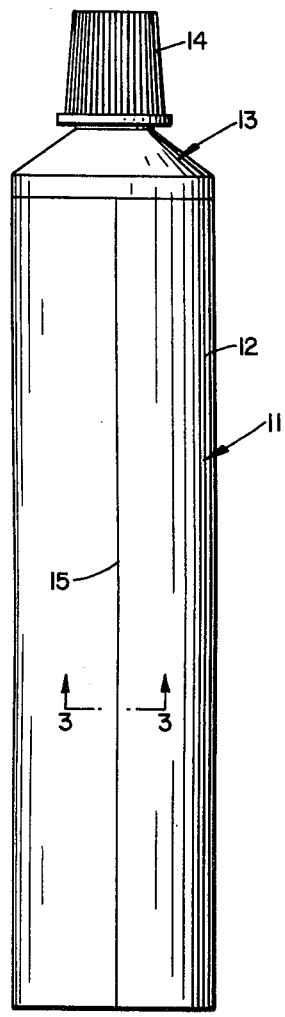
FIG. 1 is a side elevation showing a collapsible tube made according to the invention.
Figure 2:
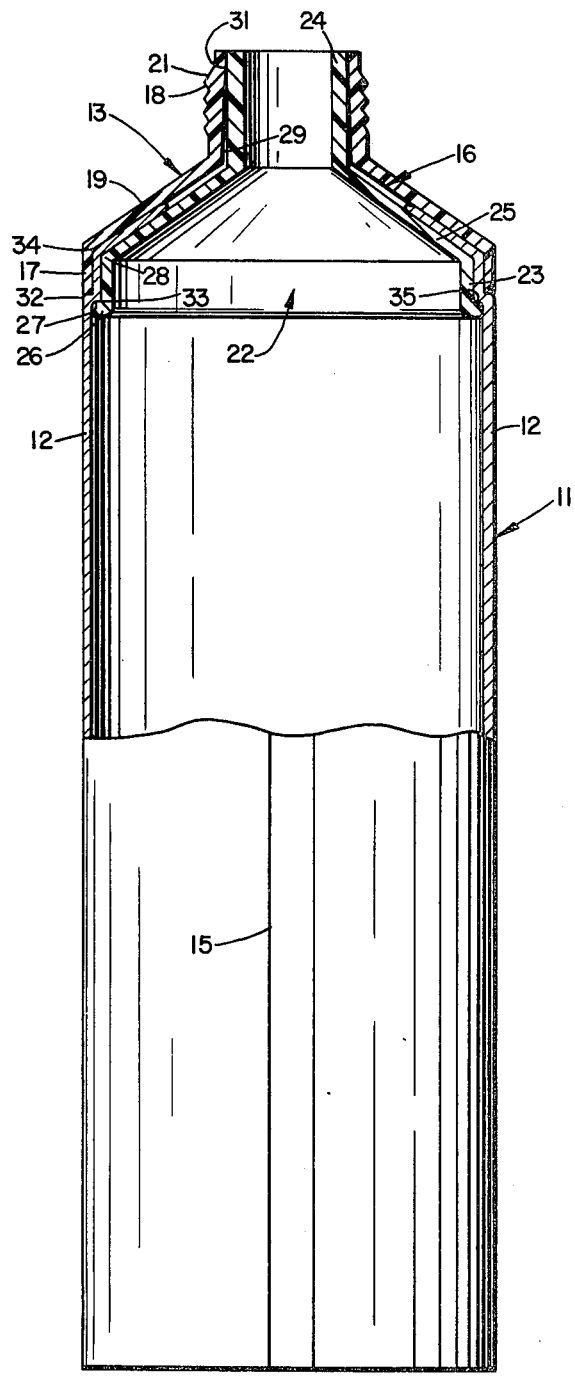
FIG. 2 is an enlarged side elevation of part of the tube of FIG. 1 partly broken away and in section to illustrate a preferred head structure.
Figure 3:
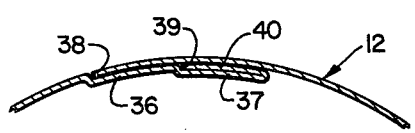
FIG. 3 is a fragmentary section substantially on line 3—3 of FIG. 1 illustrating a longitudinal body seam structure.

FIGS. 1–3 show an unfilled dispensing tube 11 according to the invention. The tube comprises a flexible tubular body 12 open at one end and secured at the other end to a head structure 13 closed by cap 14.

Tube body 12 is formed from a single sheet of flexible material such as aluminum foil or a synthetic plastic. In the case of tubes for fluid paste products, the tube body is usually aluminum foil laminated with a plastic external layer bearing printed matter and, in the case of many toothpastes and the like, may be lined with a synthetic plastics layer impervious to the product. The tube body has a longitudinal seam 15 extending its entire length.

The tube head structure comprises an integral one-piece annular molded synthetic plastics outer head element 16 formed with a cylindrical skirt 17 and a reduced diameter discharge nozzle 18 connected by an annular tapered shoulder 19 that slopes at about 60° to the tube axis. Nozzle 18 is externally threaded at 21 to mount cap 14.

An inner head element 22 is tightly fitted or nested within head element 16. Element 22 is preferably an annular integral one-piece molded synthetic plastics part having a cylindrical skirt 23 and a tubular nozzle lining portion 24 joined by a tapered shoulder 25. The free end of skirt 23 has an external annular flange 26.

One end of the flexible tube body 12 extends longitudinally closely over flange 26, then at about right angles over the corner 27 at the end of the flange, then substantially radially inwardly between flange 26 and the lower edge of head element skirt 17, then longitudinally in the annular space between skirts 17 and 23, and then over the obtuse angle corner 28 between skirt 23 and shoulder 25 into the space between shoulders 18 and 25.

The parts are so dimensioned that the outer periphery of flange 26 is of a diameter that is slightly less than the diameter of the outer periphery of skirt 17 whereby, since body 12 is only a few thousandths of an inch in thickness, in the assembly the outer surface of skirt 17 will appear as a substantial continuation of the outer surface of body 12. The relationship of parts is illustrated rather exaggeratedly in FIG. 2 for clarity of explanation.

The skirts 17 and 23 are of the same contour and they are radially spaced by only the small amount necessary to frictionally receive the wall thickness of body 22 between them. Similarly shoulders 18 and 25 are of the same contour and slope and the annular space between them is only the small amount necessary to frictionally receive the wall thickness of body 12 between them. The smooth internal surface 29 of nozzle 18 is preferably cylindrical, and the smooth external surface 31 of nozzle lining portion 24 of the inner head element is preferably slightly tapered with the smaller end of the taper being at the outer end and substantially equal in diameter to the cylindrical interior of nozzle 18. Thus when head element 22 is forced into head element 16 there is a strong force fit between the nozzle parts at 18, 24 as permitted by the resiliency of the plastics material of head element 16. The head element 16 is preferably of polypropylene, while the insert is made of a harder more brittle material such as urea formaldehyde which provides a protective barrier for the polypropylene.

With the inner head element forced within head element 16 to the position shown in FIG. 2 it will be noted that the wall of the tube is forced into three relatively sharp sequentially reversed annular bends indicated at 32, 33 and 34 respectively that effectively resist longitudinal forces tending to pull tube body 12 away from the head structure. Preferably the lower edge 35 of skirt 17 axially abuts the radially inwardly extending portion of the tube body between the bends 32 and 33 to further improve resistance to longitudinal separation.

With reference to FIG. 3 the sheet material fo body 12 is formed along one longitudinal edge with parallel shallow successively inwardly stepped sections 36 and 37 having circumferentially facing shoulders 38 and 39 respectively. The terminal section is doubled back tightly on itself to form an external lip 40 that has its terminal edge abutment with shoulder 39. The other longitudinal edge of the sheet material extends tightly over the lip 40 and wall section 36 to terminate in a longitudinal edge in abutment with shoulder 38. Thus externally except for the fine usually invisible line at shoulder 38 the external body surface appears continuous. The double and triple thicknesses of material at the seam project internally of the tube body and to not affect the external contour. As will appear this seam may be formed by suitable automatic apparatus, the sheet material of the body being such that it will maintain a given shape.

Figure 4:
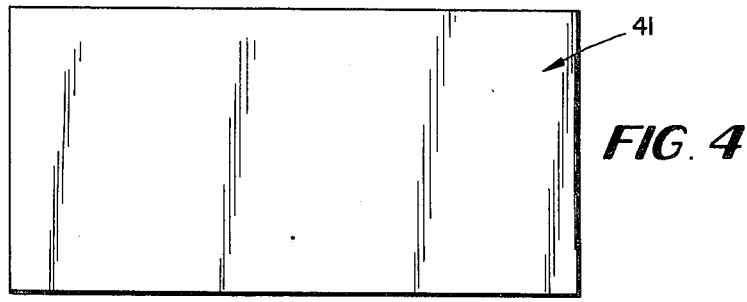
FIG. 4 is a plan view showing the sheet blank from which the tube body is formed.
Figure 5:
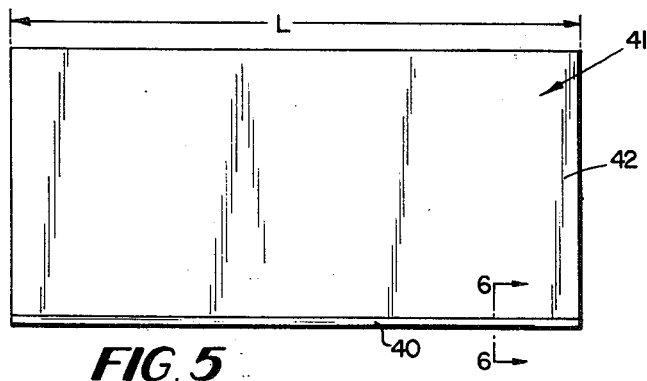
FIG. 5 is a plant view of the blank of FIG. 4 showing the initial edge fold.
Figure 6:
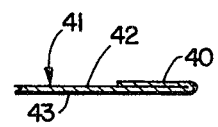
FIG. 6 is a fragmentary section substantially on line 6—6 in FIG. 5 showing the edge fold structure.

FIGS. 4–9 and 9A illustrate a first operation in forming the tube body. A flat rectangular sheet blank 41 of suitable size for forming a single tube body is provided. The blank 41 is externally coated and/or printed and is internally coated as may be required for the final tube body. This blank may be severed from the leading end of a continuous strip, or presevered sheets may be provided and fed in succession from a magazine. As shown in FIGS. 5 and 6, the blank may be turned reversely upon itself through about 180° along one longitudinal side edge to form the constant width lip 40 lying as flat as possible against the outer printed surface 42 for the entire length of the blank. The coated blank surface 43 which will be in contact with the product is on the outer side of lip 40. This surface bears a layer of thermoplastic material such as polyethylene that is also impervious to the product.

Figure 7:
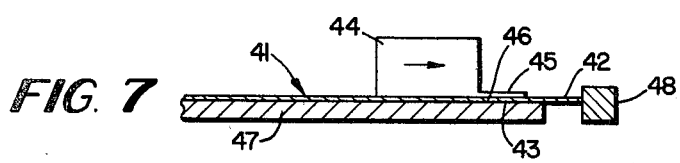
FIGS. 7, 8 and 9 are diagrammatic side elevation views partly in section illustrating the apparatus for carrying out setps in forming the edge fold in the blank.
Figure 8:
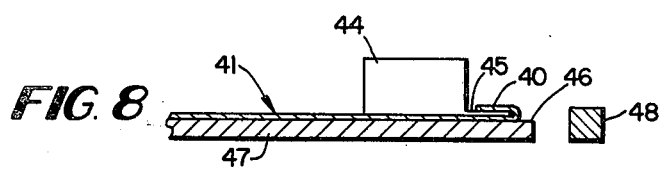
Figure 9:
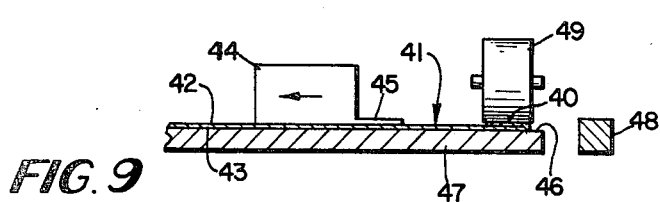

FIGS. 7-9 diagrammatically show an apparatus for forming lip 40. The blank 41 with the printed surface 42 on top is slidably inserted below a forming die block 44 that has a forwardly projecting thin ledge 45. Preferably blank 41 is slidably supported on the horizontal surface 46 of a stationary support 47. A stop 48 parallel to the edge of ledge 45 is fixed with respect to surface 46 and it locates the blank to project beyond ledge 45 a distance substantially equal to the desired width of lip 40.

Now the blank edge is turned over ledge 45 as shown in FIG. 8. The width and thickness of ledge 45 are adequate to permit a substantially 180° bend here but it has been found that for some thicknesses of metal inherent resiliency may cause the lip 40 to slightly spring back through a small angle.

The die block 44 is displaced to remove ledge 45 from beneath lip 40, the folded over lip bearing edge of the blank remaining still supported by surface 46, and it has been found advantageous in this phase of the invention to lower a forming roller 49 onto lip 40 and traverse the length of lip 40 with the roller to obtain a substantially flat closed deadfold position of lip 40 such as shown in FIG. 9.

Figure 9A:
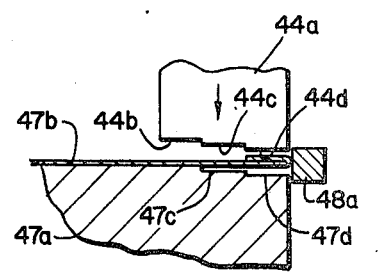
FIG. 9a is a fragmentary end view illustrating die means for further shaping the blank.

The blank 41 with the formed lip 40 is now transferred to the die assembly shown in FIG. 9a where the fixed lower support 47a has a flat upper surface 47b and along one edge successibely stepped recessed surface sections 47c and 47d corresponding in width to the blank sections 36 and 37 of FIG. 3. The blank is transferred from the apparatus of FIG. 9 to overlie support 47a as shown in FIG. 9a with a stop 48a in abutment with the lip bearing edge. Now an upper die member 44a having a surface 44b adapted to engage and clamp the blank onto support 47a and successive projecting sections 44c and 44d corresponding to recessed sections 47c and 47d descend to shape the blank edge as required for the seam shown in FIG. 3.

The blank may be found with the stepped edge section before lip 40 is turned over, as may be desired.

Further the blank of FIG. 4 may be formed with the lip 40 and stepped sections 36 and 37 in a single device as will be described in FIGS. 38-40 herein.

The partially formed blank 41 is now removed to the apparatus illustrated in FIGS. 10-15. This apparatus provides a fixed support 51 having a flat smooth horizontal top surface 52 over which blank 41 with printed surface 42 on the underside is slidably moved until the non-folded edge contacts a fixed stop 53. Stop 53 locates blank 41 with its central longitudinal portion disposed over a rectuangular opening 54 in support 51 that extends in the plane of the paper a distance greated than the length $l$ of the blank 41. Lip 40 is on the underside of the blank. The width of the blank is now centered on the vertical axis V indicated in FIG. 10.

Mounted above support 51 sufficiently to permit the foregoing sliding movement of blank 41 is a cylindrical mandrel 55 the circumference of which is equal to the desired internal diameter of the body 12. Preferably the cylindrical surface of mandrel 55 is coated with a hard smooth material such as polytetrafluoroethylene. Mandrell 55 is mounted for vertical displacement on axis V toward support 51 and is preferably held against rotation on its axis, and for this purpose it may be found at opposite ends with vertical guide bars 50 that are slidable in suitable guide ways (not shown). The width of rectangular opening 54 is sufficiently greater than the diameter of mandrel 55 to permit free movement of the mandrel down through opening 54, for a purpose to appear.

Mounted below support opening 54 is a stationary die member 56 having on its upper side a semi-cylindrical recess 57 that extends at least the length of opening 54. The radius of curvature of recess 57 is equal to the radius of the outer surface mandrel 55 and the center of curvature of recess 57 is on the vertical axis V.

A vertically movable die member 58 centered on axis V is slidable in a slot 59 in support 56. Member 58 has a length equal to at least the length $l$ of blank 41, and the upper end 61 of member 58 is initially disposed adjacent opening 54 just below the blank 41. Preferably the upper end surface at 61 is cylindrically concavely curved parallel to the surface of mandrel 55.

Below stationary die member 56, the movable die member 58 is mounted to be normally resiliently urged to its uppermost initial position of FIG. 10. This mounting is indicated in FIG. 10 as provided by compression spring means 62 disposed between projections 63 on member 58 and a fixed support part 64.

Mounted above die member 56 and below support 51 are opposed laterally movable die members 65 and 66. Die member 65 is formed on its inner side with a cylindrically curved surface 67 that terminates at its upper end in a relatively sharp edge 68 disposed initially adjacent parallel to and just below a side edge of rectangular opening 54. Similarly die member 66 is formed on its inner side with a cylindrically curved surface 69 that termiates at its upper end in a relatively sharp edge 71 disposed initially adjacent, parallel to and just below the opposite side edge of opening 54. The axes of surfaces 67 and 69 are parallel to the axix of recess 57, and the radius of curvature of each surface 67 and 69 is the same as that of recess 57. In operation, members 65 and 66 are slidable toward each other, preferably being slidably mounted on member 56, to a position where the axes of curvature of surfaces 67 and 69 coincide and lie on the vertical asix V, as will appear.

A combined pressure die and heater member 72 is mounted above the level of mandrel 55, and it has a downwardly projecting heat sink bar 73 that extends the length of mandrel 55. Bar 73 is preferably formed with a concave cylindrical surface 74 having its axis on and at right angles to vertical axis V. An electrical heater element 75 is enclosed within the member 72 and connected to a suitable source of heat energy (not shown). As shown in FIGS. 10, 10A and 10B, the upper surface of mandrel 55 is formed with a longitudinal groove 76 parallel to the axis of the mandrel and laterally centered with respect to axis V. Each end of the mandrel is formed with vertical guide bar projections 50. In a preferred embodiment the recess 76 has fixedly mounted therein a strip of resilient material 76a capable of deformation below the cylindrical surface of the mandrel as will appear. Strip 76 is preferably a body of heat resistant silicone rubber, and both groove 76 and the body 76a may be of keystone shape as shown to resist displacement of the body out of the groove.

Starting with the parts in the initial position shown in FIG. 10, the mandrel 55 is moved vertically downwardly until it enters the stationary die member recess 57 as shown in FIG. 11. Mandrel 55 first engages blank 41 and displaces its central longitudinal region downwardly in support opening 54 until it is clamped between the mandrel and the upper concave end 61 of movable die member 58. Then continued downward movement of mandrel 55 will draw the blank 41 symmetrically down through opening 54, the upward spring bias on member 58 permitting this movement in a controlled manner. Die member 58 is moved down in this manner until concave surface 61 reaches the bottom of recess 57 where it becomes a substantial continuation of recess 57. At this point the blank 41 has been formed into substantially U-shape as shown in FIG. 11 with its central longitudinal portion cylindrically formed and trapped between mandrel 55 and recess 57. The foregoing operation takes place with a minimum of rubbing or sliding between the surfaces of the die members and blank 41.

Preferably during this operational step the pressure member 72 may move down along with the mandrel but in such manner as to maintain its spacing from the mandrel and remain above supprt opening 54, as shown in FIG. 11.

Figure 12:
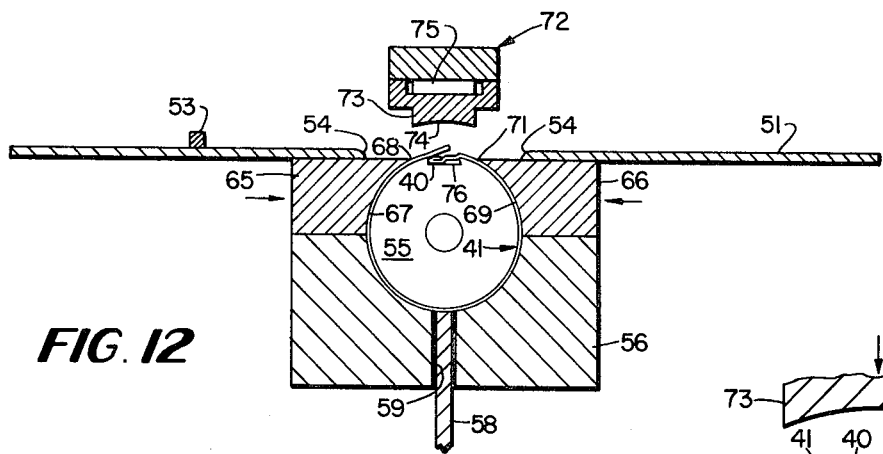
FIG. 12 is an end view in section showing the apparatus and method of FIGS. 10 and 11 in a further condition wherein lateral dies complete mechanical bending of the blank.

Next the laterally movable die members 65 and 66 are moved toward each other to the position shown in FIG. 12, by suitable force applying means indicated by the arrows in FIG. 12. Die surfaces 67 and 69 contact the upstanding free sides of blank 41 and move their edges into overlapping relation onto and around the upper part of the mandrel. Since surfaces 67 and 69 are of the same curvature as recess 57 they therefore substantially complete cylindrical wrapping of the blank 41 about mandrel 55.

Figure 13:
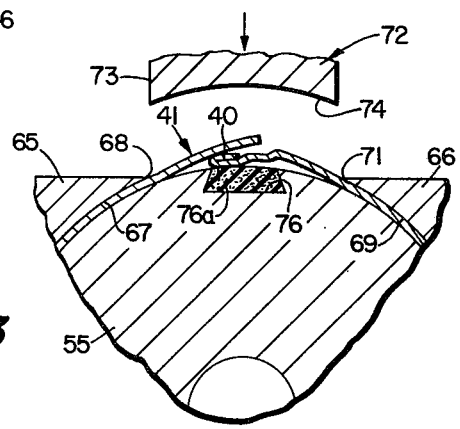
FIG. 13 is an enlarged fragmentary view mainly in section showing the blank edges overlapped at the mandrel groove in the FIG. 12 condition.

However, each of surfaces 67 and 69 is less than a quadrant so that in the FIG. 12 condition the upper edges 68 and 71 of these die members are spaced apart a distance at least equal to the width of bar 74, as shown more clearly in FIG. 13. FIG. 13 also shows the relative dispositions of the opposite side edges of the blank 41 at this point. The folded side edge of the blank carrying lip 40 is now disposed over the cushion strip 76a in mandrel groove 76, and the opposite side edge of the blank extends over the groove and lip. If necessary to ensure that the lip bearing edge is beneath the opposite edge at this point the die member 66 may be times to move to its FIG. 12 position slightly prior to member 65.

Figure 14:
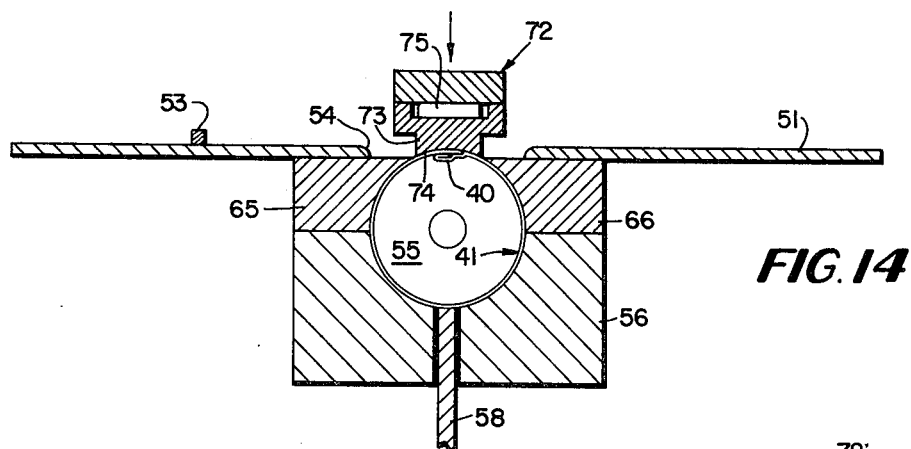
FIG. 14 is an end view in section showing the apparatus and method of FIGS. 10–12 in a further condition wherein the longitudinal body seam is completed.
Figure 15A:
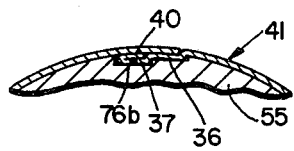
FIG. 15a is an enlarged fragmentary view in section similar to FIG. 15 but showing a shaped groove in the mandrel.
Figure 15:
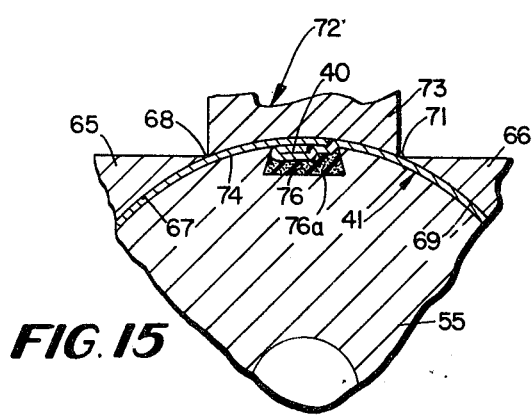
FIG. 15 is an enlarged fragmentary view mainly in section showing in detail application of heat and pressure in forming the longitudinal seam.

Finally as shown in FIGS. 14 and 15 the die member 72 is lowered relative to the mandrel to engage the overlapped side edges of blank 41 under heat and pressure to complete and close the seam 15 all along its entire length. Heating element 75 is energized at this time. As shown in detail in FIG. 15, the folded lip edge 40 of blank 41 is pressed into the mandrel groove 76 by the action of surface 74 which applies uniform pressure and heat. As shown in FIG. 13 the cushion body 76a deforms under pressure so that the triple and double thicknesses of the tube wall material are disposed internally of the tube body wall. Where there is no cushion body in the groove as in FIG. 15A, the groove 76b may be of stepped configuration and the multiple thicknesses of the body wall compressed within the groove. The thermoplastic surface 43 fuses to bond the inner surface of the blank to lip 40 and to the outer surface of the blank adacent the groove whereby a closed seam is formed. There are multiple wall thicknesses of the blank at the seam but, since this region has been depressed into the mandrel groove, there are no unsightly or otherwise objectionable ridges on the outer surface of the seam which gives the appearance of a completely continuous surface, as also shown in FIG. 3. Fusion of the thermoplastic material 43 also provides a continuously tubular lining of this material that is not interrupted at the seam. The die member 72 is moved upwardly through opening 54 after the seam has been completed.

The tube body shell is now complete and ready for assembly with the head structure, and will be referred to later as shell 80.

FIGS. 16 and 17 illustrated further apparatus for accomplishing the foregoing operations of FIGS. 10–15. As shown in FIG. 16 mandrels 55 in turn supported at opposite ends by their stub shafts 81 may slide down an inclined chute 82 where they are controlled by a gate indicated at 83 that releases a fresh mandrel each time a seaming operation is completed and the wrapped mandrel is removed from recess 57.

At the lower end of the chute the vertical guide bars 50 of the released mandrel enter socket assemblies 84 on a frame 85 that thereby non-rotatably supports the mandrel. Frame 85 is mounted in vertical slide guides 86 and supported at its lower ends by compression springs 87. A subframe 88 is supported on frame 85 by compression springs 89 that are more resistent to compression than springs 87 which are strong enough to carry the weight of the frames, a mandrel 55 and the upper die member 72 which is mounted on subframe 88. Force applying devices such as fluid pressure motors 91 are mounted at the ends of frame 88.

The parts are so constructed and apportioned that starting with a mandrel 55 in position as in FIG. 10, motors 91 exert a downward force to displace frame 85 down through support opening 54 as described. Since springs 89 are relatively stiff they do not yield and die member 72 will move down in maintained spaced relation to the mandrel. After the mandrel has bottomed in recess 57 the downward force is continued for a period to hold it there while the lateral dies 65 and 66 are moved into the FIG. 14 position. Then the downward force exerted by motors 91 is increased with the result that springs 89 collapse and the subframe 88 moves down to permit die member 72 to complete the seam as described for FIGS. 14 and 15. At the right side of FIG. 16 is shown an alternative mounting for one of the lateral die members 66, whereby it may slide on an inclined plane to laterally engage the blank instead of horizontally in FIGS. 10–15.

Figure 18:
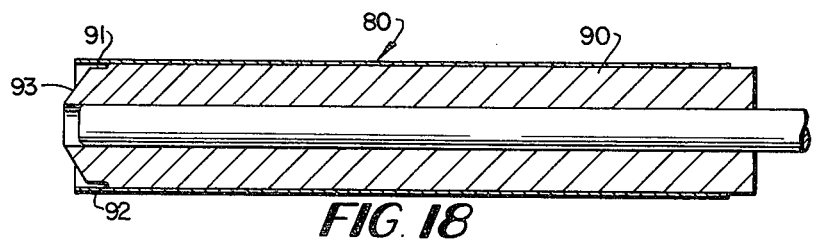
FIG. 18 is a side view showing a formed tube body mounted on a mandrel in the initial stages of assembly of the tube body with the head structure according to a preferred embodiment.

Referring now to FIGS. 18–23 the open ended tube body shell 80 made by the apparatus and process of FIGS. 4—17 is mounted on a cylindrical mandrel 90 that at one end is formed with a reduced diameter cylindrical portion 91 extending from a radial shoulder 92 and terminating in an inclined converging generally conical portion 93. The diameter and axial length of mandrel portion 91 are substantially the same as the internal diameter and axial length of outer head element skirt 17, and the slope of surface 93 is the same as that of outer head element shoulder 18. As shown in FIG. 18 the shell is initially positioned to extend at one end over the reduced diameter end of the mandrel 90.

Mandrel 90 with the shell 80 on it is positioned in axial alignment with a relatively stationary die member 94 that is recessed at 95 to receive a preformed outer head element 16. Recess 95 has an outer large diameter entrance portion 96 of such diameter as to snugly slidably receive skirt 17 of the head member and is formed with a tapered internal surface 97 against which shoulder 18 abuts. Recess 95 is otherwise large and deep enough to freely accept the capped nozzle.

As annular die member 98 having cylindrical surfaces 99 and 100 corresponding to the cylindrical mandrel surfaces, a shoulder 101 corresponding to mandrel shoulder 94 and a tapered annular surface 102 corresponding to the conical end of the mandrel is applied to conform the extended end of shell 80 to the shape of the mandrel end. This is done preferably by axially engaging the die member 98 with the mandrel end under pressure, and as a result the shell end is formed to the shape shown in FIG. 19 wherein it conforms to shoulder 92 and surfaces 93 and 96. FIG. 20 shows the formed shell on the mandrel as having an annular radial shoulder section 103, a cylindrical section 104 and a crimped tapered end section 105.

Mandrel 90 is preferably hollow with a central bore 106 for slidably mounting a guide and pilot rod 107 that has a diameter adapted to slidably enter nozzle 18 of the outer head element 16. The rod is inserted into the nozzle and mandrel 90 with the formed shell 80 on it is displaced axially along rod 107 until the formed end of the shell enters outer head element 16, this condition being shown in FIG. 21. As a result of this operation the formed end of shell 80 is forcibly fitted to line the shoulder and skirt of outer head element 16, and the cylindrical surface of the shell is frictionally disposed with recess surface 96. This friction force fit of the end of the shell within the outer head element and the recess is sufficient to retain the shell attached to the head element when mandrel 90 and rod 107 are axially withdrawn, this being the condition shown at the left side of FIG. 22.

Figure 22:
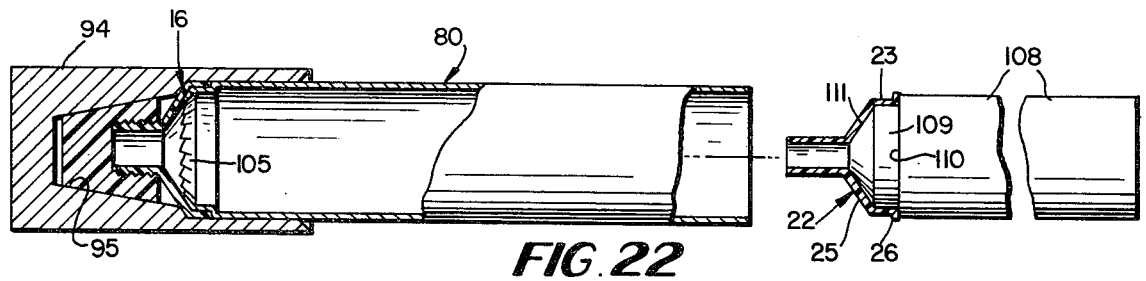
FIG. 22 is a side elevation partly in section showing a further phase wherein the inner head element of the head structure is mounted for introduction.
Figure 23:
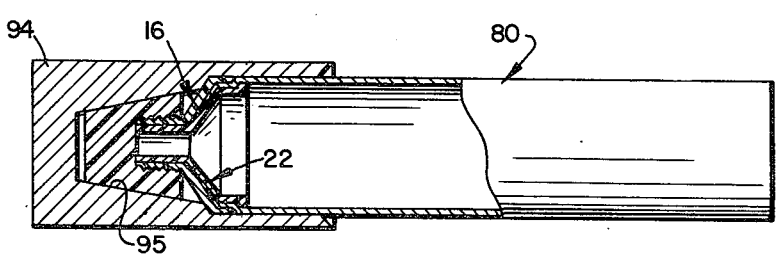
FIG. 23 is a side elevation partly in section showing completion of the inner head element introduction phase.

Now the preformed inner head element 22 is mounted on the shaped end of a cylindrical mandrel 108 as shown at the right side of FIG. 22. Mandrel 108 has a reduced diameter surface 109 adapted to smoothly slidably receive the skirt 23, an axial shoulder 110 adapted to about flange 26 and an end surface 111 tapered in conformance with insert shoulder 25 which it engages. Mandrel 108 is displaced axially to the left in FIG. 23 until nozzle section 24 of the inner head element forcibly enters and lines outer nozzle 18. The crimped end 105 of the shell 80 is compressed and clamped between tapered shoulders 18 and 25, the flange 26 is forcibly engaged against shoulder section 103 of the shell and the cylindrical section 104 of the shell is frictionally compressed between the skirts 17 and 23. Preferably the edge 32 of skirt 23 forcibly axially abuts shoulder section of the shell to clamp it against insert flange 26, all as shown in FIG. 23.

Figure 22A:
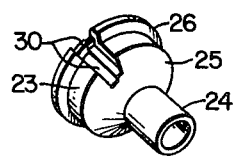
FIG. 22A is a generally perspective view showing the inner head element formed with an external surface recess for accommodating the body seam during assembly of the head elements.
Figure 22C:
FIG. 22C is an enlarged section on line 22c—22c of FIG. 22B comprising a fragmentary showing of the seam as disposed in the surface recess of the inner head element.

As shown in FIG. 22A the inner element 22 is preferably formed with a shallow longitudinal external recess 30 of constant depth that extends across flange 26, along skirt 23 and partially along shoulder 25. The purpose of recess 30 is to accommodate the increased thicknesses of the tube body shell at the longitudinal seam so that when the inner and outer head elements are assembled to the FIG. 23 condition the internally projecting multiple layers of the tube body material will become disposed in recess 30, and this is particularly advantageous in the turned over crimped are of the seam that overlies the shoulder of the inner head element. As shown in FIG. 22C the recess 30 may be laterally stepped for accommodating the side by side double and triple thickness wall regions.

Figure 22B:
FIG. 22B is an end view of the mandrel mounted inner head element of FIG. 22.

It has been found that, by providing the recess 30 of sufficient length along the element to extend beyond the crimped section 105 as shown in FIG. 22B, the double and triple thicknesses of material at the seam (FIG. 15) are disposed in that recess (FIG. 22C) whereby the snug interfit of the head elements is greatly improved and the external surface of the seam at its juncture with the skirt of the outer head element presents a smooth continuous appearance. There will be little or no outward bulge of the external head element where it overlies the seam.

During assembly the body seam may be suitably registered in alignment with the recess 30. Where the body is formed on a split mandrel as later herein disclosed this registration can readily be effected by providing suitable internal keying projection on the inner head element related to the location of the seam on the body being formed on the mandrel.

This completes assembly of the empty tube body and attached head structure, so that when the assembly is complete it may be withdrawn axially from die member 94, and this provides the required empty tube assembly shown in and described for FIGS. 1–3.

Figure 24:
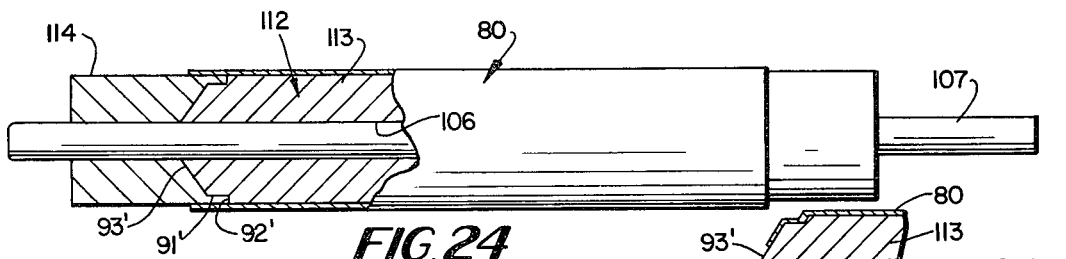
FIG. 24 is a side elevation partly in section showing an embodiment of the invention using a split mandrel.

FIG. 24 illustrates an embodiment wherein a mandrel 112 usable in the operations disclosed for FIGS. 10–17 is a split mandrel consisting of separable axially interfitting cylindrical sections 113 and 114 of the same external diameter. The interfitting ends of sections 113 and 114 are formed with snugly engaged axial shoulder surfaces 92', reduced diameter cylindrical surfaces 91' and tapered annular surfaces 93' corresponding to the formed end 92, 91 and 93 of mandrel 92.

Figure 24A:
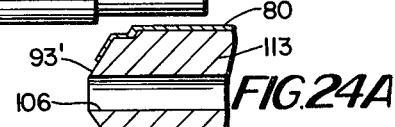
FIG. 24A is a fragmentary side elevation showing shaping of the tube body onto the split mandrel section.

With the mandrel sections engaged as shown in FIG. 24, the mandrel 112 is wholly cylindrical to serve as the mandrel used in FIGS. 10–17 for formation of the cylindrical body shell 80. Then the section 114 may be removed, and the end of the shell 80 shaped to the end of mandrel section 113 as shown in FIG. 24A. The mandrel section 113 is now the same as mandrel 92 of FIGS. 18–21 and used in the same manner to complete the container assembly.

Thus, using a split mandrel, the same mandrel unit may be used in the operations of FIGS. 10–21. The mandrel bearing the formed shell 80 may thus be extracted from the seam forming apparatus of FIGs. 10–17 and after sectional separation placed in the assembly apparatus of FIG. 19.

Figure 25:
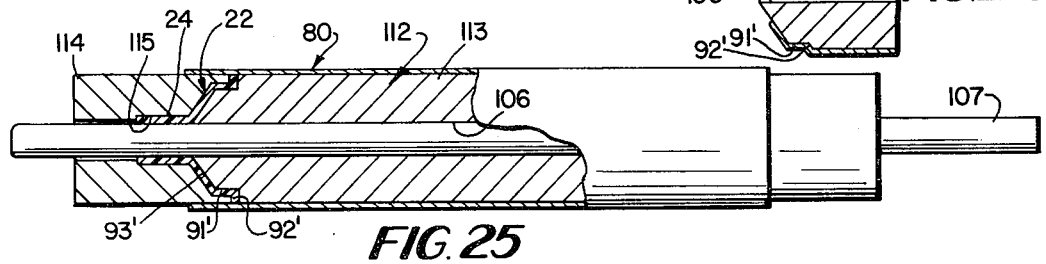
FIG. 25 is a side elevation partly section showing a further split mandrel embodiment like FIG. 24 but wherein the body tube may be further conformed to the inner head element.
Figure 26:
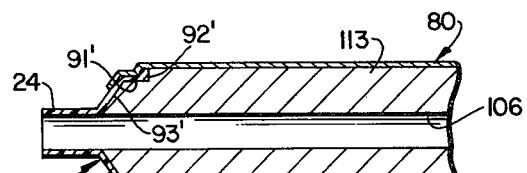
FIG. 26 is a fragmentary side elevation showing the mandrel of FIG. 25 split and the tube body end conformed to the contour of the inner head element.

FIGS. 25 and 26 illustrates a modification of the split mandrel technique. Here the mandrel sections are basically the same external configuration as in FIG. 24, but the sections are initially assembly with the performed inner head element 22 mounted axially between them. In this embodiment mandrel section 114 is additionally formed with an internal recess 115 to accommodate nozzle lining section 24 of the inner head element.

Here the shell 80 is formed on the mandrel assembly shown in FIG. 25, and mandrel section 114 is removed, so that the end of formed shell 80 now extends over the flange 26 and skirt 23. Now the extended end of the shell 80 is operated upon by forming die 98 of FIG. 19 and as a result it is conformed to the external contour of inner head element flange, skirt and tapered shoulder as shown in FIG. 26. This assembly, with the body tube attached to the inner head element and both still mounted on mandrel section 114 which is slidably guided on rod 107 is disposed in the apparatus of FIG. 19 in the location shown there for mandrel 92, and upon axially bringing together the mandrel 114 and die member 94 the inner head element, shell end and outer head element 16 will be forcibly nested and interconnected to provide the same resultant assembly as shown in FIG. 23 and FIGS. 1–3.

Thus in the form of the invention disclosed in FIGS. 25 and 26, the same mandrel unit may be used during the entire seam forming and head structure attachment operation.

Figure 27:
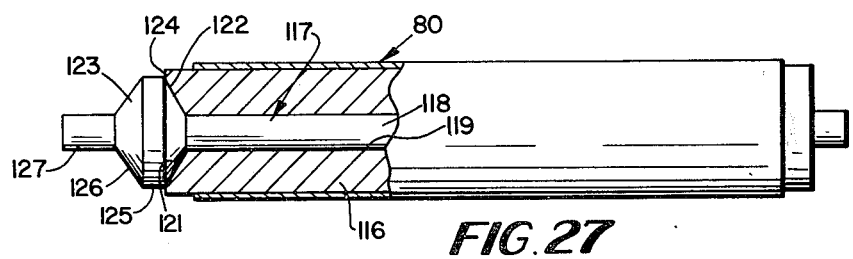
FIG. 27 is a side elevation partly in section showing another embodiment of the invention wherein the inner head element may be mounted on an auxiliary mandrel part after the tube has been formed and the longitudinal seam completed on the main mandrel.
Figure 28:
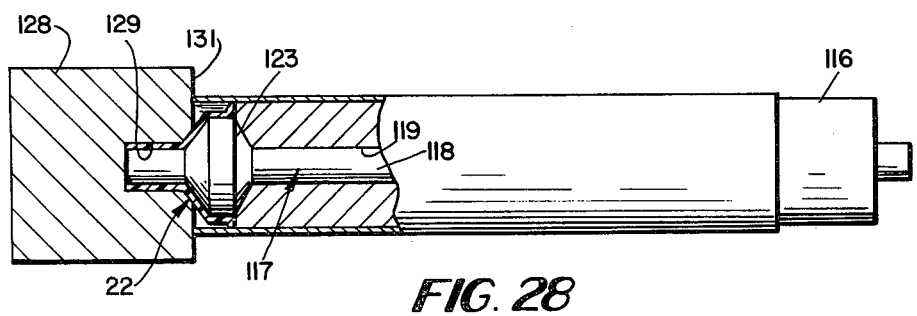
FIG. 28 is a side elevation partly in section showing the operation, using the FIG. 27 apparatus, of attaching the tube body end to the inner head element prior to assembly with the outer head element.

FIGS. 27 and 28 illustrate another embodiment wherein the same mandrel unit may be used during seam forming and attachment of the head structure.

The shell 80 may be formed on the cylindrical mandrel 116 following the procedures of FIGS. 4–15. Then the inner head element mounting member 117 is mounted on mandrel 116.

Member 117 comprises a spindle 118 slidably introduced into mandrel bore 119 that enlarges at one end to an annular conical surface 121 interfitting smoothly with a similar surface 122 on the inner side of an enlarged section 123 of the member. At the outer end of surface 121 the mandrel terminates in a shallow flat annular end face 124 perpendicular to the mandrel axis. The outer periphery 125 of enlarged section 123 is a cylinder having a diameter equal to the internal diameter of inner head element skirt 23 and an axial length equal to the length of skirt 23. Section 123 is formed with an annular tapered surface 126 of the same inclination and axial extent as inner head element shoulder 25, and member 117 terminates in a cylindrical section 127 having the same diameter and axial length as the interior of inner head element boss 24. The radial width of mandrel end face 124 is equal to the radial width of end flange 26 of inner head element 22.

Thus mamber 117 may be assembled with mandrel 116 while the cylindrical shell 80 is on the mandrel and the inner head element 22 placed on the enlarged end of member 117 with flange 26 abutting mandrel end face 124.

This assembly is axially aligned with a fixed die member 128 having a cylindrical recess 129 open to admit boss 24 which is of the same axial length. Then shell 80 is slidably moved to the left in FIG. 28 into contact with flat annular axially directed stop face 131 on the end of member 128. This locates shell 80 properly to permit the ensuing forming action whereby the end of shell 80 is deformed into conformity with the external contour of inner head element 22 in the manner shown in FIG. 26.

Figure 19:
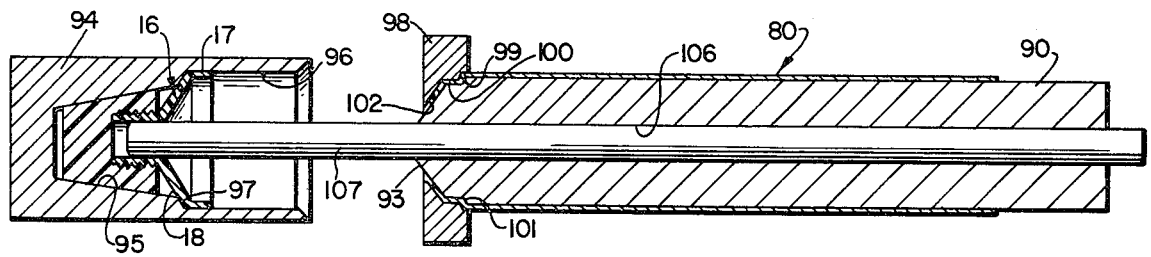
FIG. 19 is a side elevation partly in section showing a further phase in assembly of the tube body and the head structure.
Figure 20:
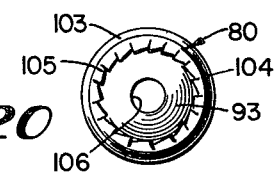
FIG. 20 is an end view showing the tube body end crimped over to the shape of the mandrel end during the FIG. 19 phase.
Figure 21:
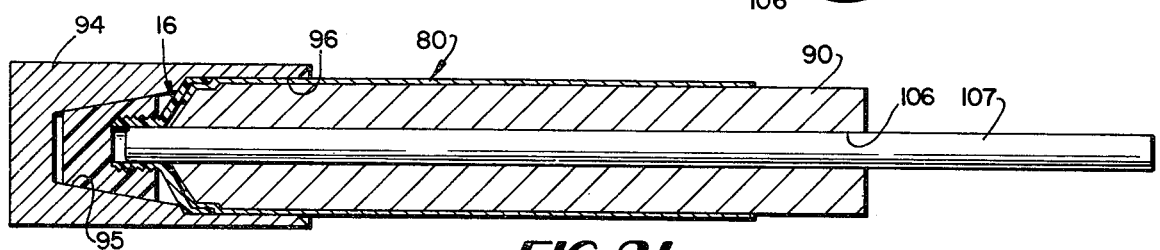
FIG. 21 is a side elevation partly in section showing a further phase of assembly of the tube body to the head structure.

Now with die member 128 removed the remaining assembly may, like that of FIG. 26, be introduced into the outer head element 16 held in die member 94 in FIG. 19 to complete attachment of the tube body and head structure.

FIGS. 29–33 illustrates another embodiment wherein the sheet blank of FIG. 5 having the lip 36 folded thereon is wrapped around a mandrel and the longitudinal seam is formed.

The blank 41, with lip 36 uppermost and disposed forwardly is slidably moved along horizontal flat surface 131 of support 132 and beyond the end of the support to abut a fixed stop 133. The leading edge of blank 41 passes beneath a horizontal pusher member 134 mounted at opposite ends on spaced arms 135 pivoted at 136. Suitable means (not shown) is provided for initially holding arms 135 in the illustrated vertical position. The front edge of member 134 is parallel to the rear edge of lip 36.

Figure 29:
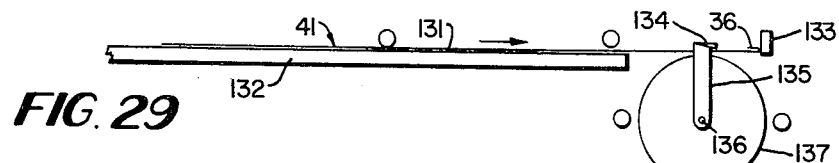
FIG. 29 is a rather diagrammatic side elevation partly in section showing an embodiment wherein the blank is wrapped around a rotating mandrel in the seam forming operation.
Figure 30:
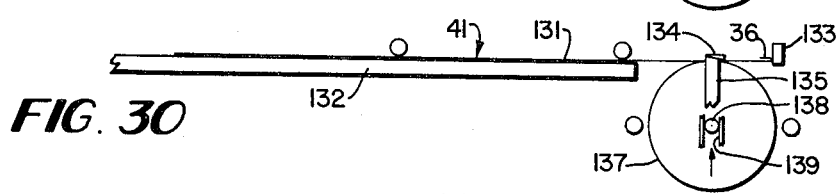
FIGS. 30–33 illustrate successive stages in the operation of the embodiment disclosed in the initial condition of the parts in FIG. 29.

A cylindrical mandrel 137 is rotatably and slidably mounted, as by stub end shafts 138 in slide guides 139 disposed axially inwardly arms 135, so to be vertically movable between the lower position spaced from pusher 134 shown in FIG. 29 and an upper position where it engages the bottom of the blank and moves it up to contact pusher 134 as shown in FIG. 30. In this upper FIG. 30 condition the longitudinal axis of mandrel 137 is coincident with axis 136.

Figure 31:
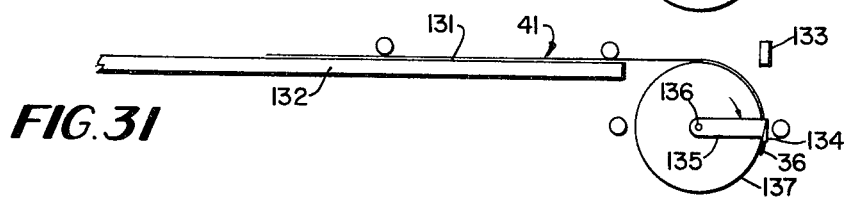

Now the pusher unit is rotated clockwise about axis 136. Pusher 134 deflects the blank 41 downwardly and eventually engages the edge of lip 36 to move the leading end of the blank down onto and upon the mandrel surface as shown in FIG. 31. The blank slides freely along the support surface. Mandrel 137 is rotated clockwise at the same peripheral speed as pusher 134 so that, as the blank contacts the surface of the mandrel it does not rub or slide thereon. Preferably the drive to mandrel 137 is unidirectional and discontinued after 360° of rotation. Any suitable mechanism for accomplishing this drive may be employed.

Figure 32:
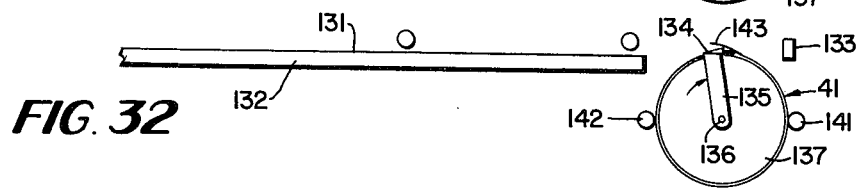
Figure 33:
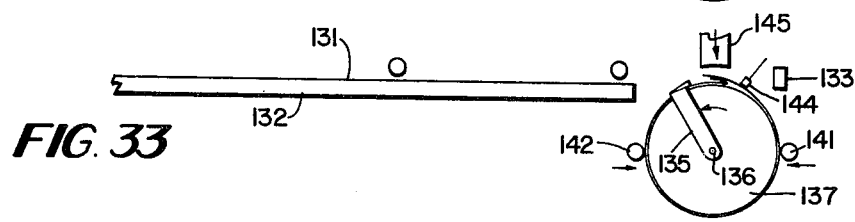
Figure 34:
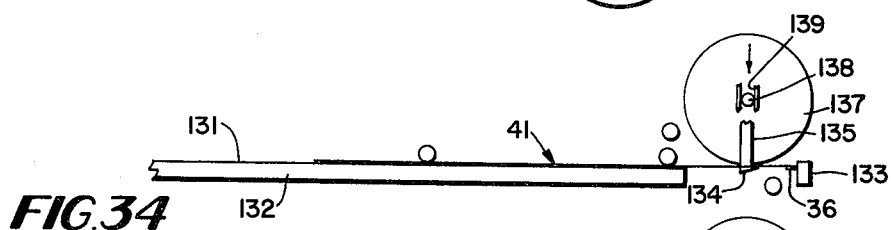
FIG. 34 is a rather diagrammatic side elevation partly in section showing a further embodiment similar to FIGS. 29–33 but with the mandrel and pusher units differently located.

After pusher 134 moves through the first quadrant a suitably mounted idler roller 141 is moved into engagement with the blank to hold it against the mandrel, and after the pusher 134 has moved through the third quadrant a second suitably mounted idler roller 142 is moved into engagement with the blank to hold it againt the mandrel, as shown in FIG. 32.

After the pusher has rotated through 360° the blank is completly wrapped around the mandrel and the trailing end indicated at 143 is FIG. 32 overlaps the lip 36 on the leading end. Now rotation of the mandrel stops and the direction of rotation of the pusher unit is reversed so that is moves relative to the mandrel counterclockwise about 30°–45° to the position shown in FIG. 33. At the same time a normally inoperative holder bar 144 is moved to engage the blank near the trailing edge and additionally hold the blank against the mandrel surface.

After retraction of the pusher, a combination pressure and heat sealer bar unit 145 is displaced vertically to engage the overlapped ends of the blank 41 and compress them to complete the seam. The unit 145 may be essentially the same as that disclosed at 72 in FIGS. 10–15. Application of heat and pressure also fuses the inner plastic coating of the blank at the seam to form a complete sealing plastic lining within the tube body. The mandrel in FIGS. 29–33 could advantageously be provided with a longitudinal groove like that at 76 on mandrel 55 for similarly improving the external appearance of the body seam.

After full pressure contact of the bar unit 145 with the seam the bar unit is raised, the mandrel 137 is lowered to the FIG. 29 position and the mandrel with the shell 80 now completely formed on it is removed for further operations.

FIGS. 34–37 illustrates another arrangement of the parts of FIGS. 29–33 for wrapping the blank 41 of FIG. 2 around a mandrel and forming the longitudinal seam. In this embodiment the rotatably mounted cylindrical mandrel 137 is disposed above the horizontal path of feed of blank 41 and the arms 135 are pivoted on an axis 136 parallel to the edge of lip 36 on the blank. The blank in this arrangement is fed with lip 36 down.

In operation mandrel may be disposed substantially in contact with the upper surface of blank 41, and the pusher unit comprising arms 135 and pusher 134 is displaced upwardly until the pusher engages the underside of the blank and moves it into firm contact with the mandrel. At this time axis 136 and the axis of the mandrel coincide.

Now the mandrel 137 and pusher unit are rotated together to wrap the blank around the mandrel. As before the pusher engages the edge of lip 36 and moves the blank onto and around the mandrel surface.

Figure 35:
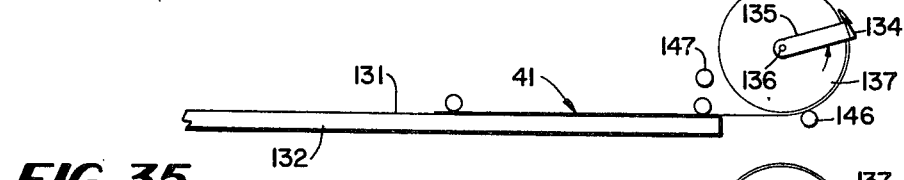
FIGS. 35–37 illustrate successive stages in the operation of the embodiment disclosed in the initial condition of the parts in FIG. 34.
Figure 36:
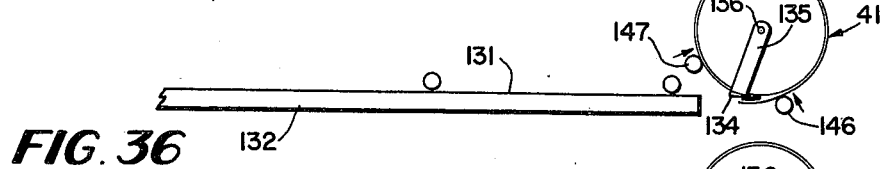

After about 90° of rotation of the mandrel and pusher, an idling roller 146 is moved into contact with the blank to hold it against the mandrel as shown in FIG. 35. After the pusher has passed the third quadrant a second idler roller 147 is moved into holding contact with the blank being wrapped onto the mandrel is shown in FIG. 36.

After the mandrel has rotated 360° its rotation is discontinued as in the earlier embodiment, and at this time the blank will be fully wrapped around the mandrel with the trailing edge 143 overlapping the leading lip bearing edge and the blank held against the mandrel in that region by roller 146.

Figure 37:
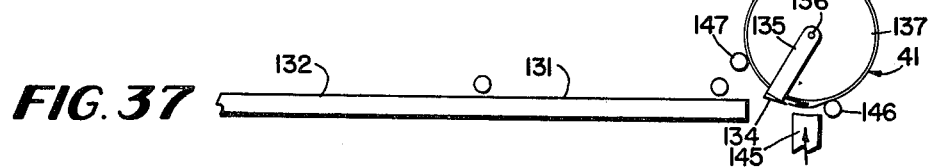

At this point the rotation of the pusher unit is reversed to retract the pusher relative to the mandrel to the displaced position shown in FIG. 37, and now the heat sealer bar unit 145 is moved vertically upwardly into compressive engagement with the overlapped edges of the blank to form the seam and complete the internal lining as described with respect to FIG. 15. After the seam clenching operation the parts are all retracted to the FIG. 34 condition and the mandrel may be removed for further operations involving the completed shell 80.

Figure 38:
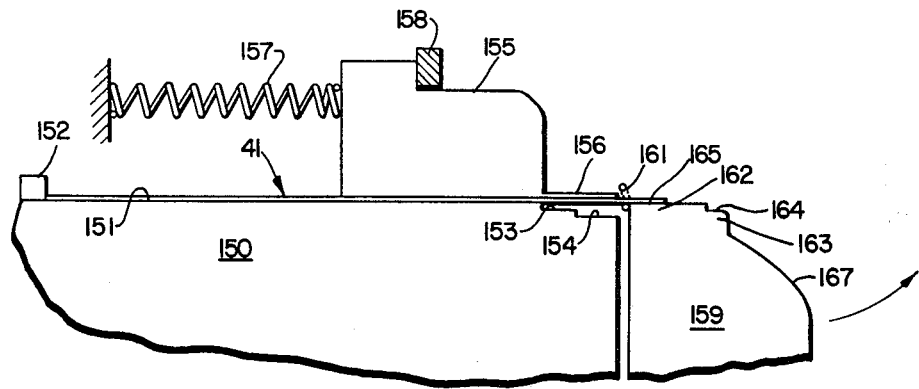
FIGS. 38–40 are diagrammatic views partly in section showing successive positions of a die device for forming the stepped lip bearing edge regions of the blank.
Figure 39:
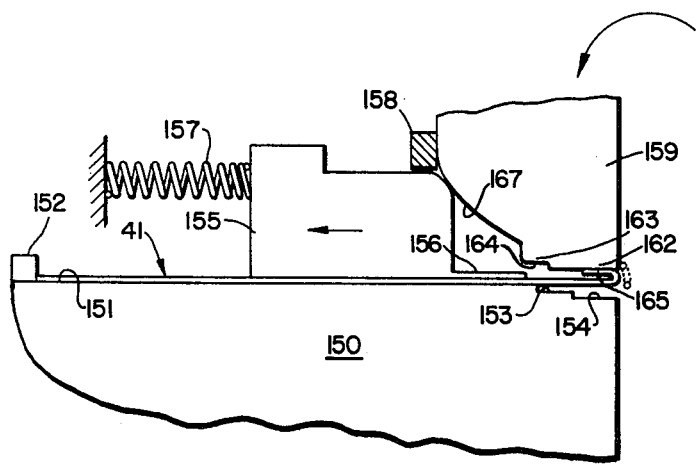
Figure 40:
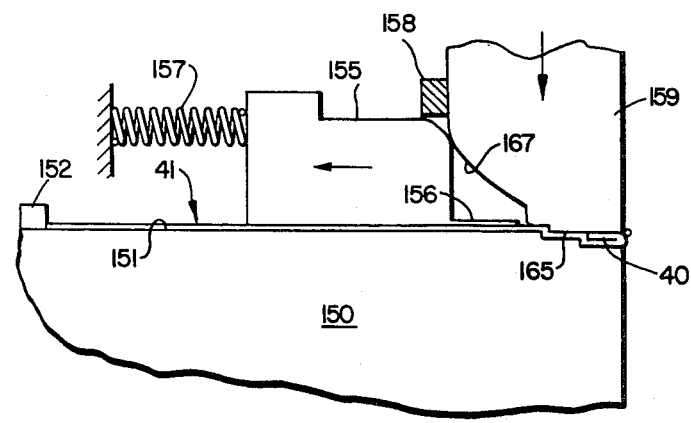

FIGS. 38, 39 and 40 illustrate a further apparatus and method whereby an edge of the blank of FIG. 4 may be formed with the lip 40 and the adjacent stepped sections 36 and 37 in a single device.

The blank 41 is first slidably located on the horizontal planar surface 151 of a support 150 as by edge stop 152. Surface 151 is formed with successive stepped edge recesses 153 and 154 corresponding in width to blank sections 36 and 37. Above the support 150 the blank is closely disposed between die block 155 which like block 44 is formed with a forwardly projecting thin ledge 156. Block 155 is horizontally slidable and resiliently biased forwardly to a lip fold position shown in FIG. 38 by spring 157, this position being determined by a fixed stop 158. It will be seen that the forward edge of ledge 156 is substantially in the vertical plane of the forward edge of support recess 154.

A pivoted die block 159 is swingable about a slide pivot structure indicated at 161 from its inactive FIG. 38 position to a lip fold position shown in FIG. 39. As shown block 159 is stepped to form an edge projection 162 and an adjacent projection 163. Projection 163 has a flat surface 164 that in the FIG. 40 position engages the upper surface of blank 41 as will appear. Projection 162 has a flat surface 165, parallel to surface 164 adapted to engage lip 40 of the blank as will appear.

As die block 159 swings to the FIG. 39 position, the flat face 165 of edge projection 162 folds the edge of the blank over ledge 156 to form lip 40. During this movement of die block 159, the rounded nose 164 engages die block 155 and slidably displaces it rearwardly until ledge 156 is withdrawn from the folded lip which remains beneath face 165.

Now the die block 159 is displaced downwardly to the FIG. 40 position where the lip bearing edge of the blank is compressed between die surface 165 and the bottom of recess 154, and the adjacent longitudinal region of the blank is deformed beneath die surface 165 and the bottom of recess 153 to form the stepped blank section 36. The resultant shaped blank is the same as that produced in FIG. 9a.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of the claims are therefore intended to be embraced therein.

I claim:

1. A method of making a collapsible tube body from a flat flexible sheet of composite metal-synthetic plastics material of predetermined dimensions that bears a finish coating on the side that is to be the outer surface of the tube body, which comprises the steps of positioning said sheet in a predetermined location across the mouth of an upwardly open forming die below a mandrel having a surface contour corresponding to the desired shape of the tube body with the longitudinal edges of the sheet substantially parallel to the mandrel axis, lowering the mandrel for clamping a longitudinally extending intermediate portion of said sheet against the mandrel surface with the side of said sheet that is to be the interior of said tube body contacting the mandrel surface and then displacing said mandrel and sheet downwardly into said forming die and wrapping said sheet substantially entirely around said mandrel with said longitudinal edges in predermined overlap, applying heat and pressure to said overlapped longitudinal edges while said mandrel holds the sheet in said die to form a longitudinally continuous body seam, and then removing the mandrel from said forming die and sliding the body off said mandrel.

2. The method defined in claim 1, wherein the inner side of said sheet is coated with thermoplastic material and one longitudinal edge of the sheet is bent back upon the finish coated side to provide a narrow longitudinal edge lip, and said material spread over the inner side of said seam during the seam forming operation to provide a continuous layer of said thermoplastic material within the tube body.

3. The method defined in claim 2, including the further step of forcibly pressing said lip tightly flat against said finish coated side of the sheet before the side edges of the sheet are overlapped.

4. Apparatus for making a collapsible tube body from a flat flexible sheet of composite metal-synthetic plastics material of predetermined dimensions that bears a finish coating on the side that is to be outer surface of the tube body, comprising a movably mounted mandrel having a surface contour corresponding to the desired shape of the tube body, die means having an open mouth adjacent said mandrel, means for locating said sheet in predetermined position across said mouth with the longitudinal edges of the sheet substantially parallel to the mandrel axis, means for clamping a longitudinally extending intermediate portion of said sheet against the mandrel surface with the side of said sheet that is to be the interior of said tube body contacting the mandrel surface, means for moving the mandrel and said clamped sheet into said die means to wrap said sheet substantially entirely around said mandrel with said longitudinal edges in predetermined overlap, and means for applying heat and pressure to said overlapped longitudinal edges while the mandrel holds the sheet in said die means to form a longitudinally continuous body seam.

5. In the apparatus defined in claim 4, said die means providing a concave forming die surface across the mouth of which said sheet is positioned, and means whereby said mandrel may be bodily displaced to first clamp an said intermediate longitudinal portion of said sheet and then displace said sheet into said concave forming die surface, said concave surface being of substantially the contour of said mandrel surface.

6. In the apparatus defined in claim 5, means defining a substantially horizontal sheet guide and support surface and an associated stop for locating said sheet thereon, said guide and support surface having an opening, means mounting said mandrel above said opening for movement toward and through said opening, and means mounting said die means below said opening with said concave surface extending beneath said opening to receive said mandrel after passage through said opening, said mandrel, opening and concave surface being substantially aligned whereby when the mandrel passes through said opening it displaces said sheet into the die means where it becomes confined between the mandrel and said concave surface.

7. In the apparatus defined in claim 6, said concave surface being substantially semi-cylindrical, and said die means including two opposed die members slidably mounted below said opening with each having an inner cylindrically curved surface conforming to the shape of the mandrel surface, and means whereby said die members are laterally movable from an outer position where they are spaced to permit the mandrel to pass downward therebetween to an inner position where they may press the sheet against the upper quadrants of the mandrel surface.

8. In the apparatus defined in claim 5, said die means comprising a fixed die member having an upwardly open substantially semi-cylindrical concave die forming surface, and said means for clamping the sheet to the mandrel comprises a vertically slidable die member projecting through said surface to initially dispose its upper end at said opening, whereby movement of said mandrel down through said opening first displaces said sheet into contact with the upper end of said slidable die member for clamping the sheet to the mandrel.

9. In the apparatus defined in claim 8, said slidable die member having its upper end of about the same substantially cylindrical contour as said mandrel and said recess whereby said sheet is contained in an arcuate clamp when urged against said slidable die member, and said upper end of the slidable die member becomes a substantial continuation of the concave die surface when the mandrel reaches its lowermost position to confine the sheet therebetween.

10. In the apparatus defined in claim 8, means resiliently biasing said vertically slidable die member toward said opening.

11. In the apparatus defined in claim 5, said means for applying heat and pressure comprising a longitudinally extending bar disposed above said mandrel.

12. In the apparatus defined in claim 11, common means movably mounting said mandrel and heater bar on separate support members connected by resilient means of such strength as to maintain said heater bar and mandrel in spaced relation upon application of mandrel displacement forces below a predetermined amount, and adapted to collapse and permit said heater bar to move against the overlapped sheet ends when a greater force is applied.

13. In the apparatus defined in claim 4, said mandrel being formed with a shallow longitudinal surface groove adapted to underlie said overlapped sheet ends whereby deformation at the seam may project mainly into the interior of the tube body being formed.

14. In the apparatus defined in claim 4, said means for applying heat and pressure comprising a bar extending londitudinally of the mandrel having an internal heating unit and having a sheet engaging surface of substantially the same contour as said mandrel.

15. In the apparatus defined in claim 13, resilient means in said groove for underlying said seam during formation thereof.

* * * * *

UNITED STATES PATENT OFFICE
CERTIFICATE OF CORRECTION

PATENT NO. : 3,952,676
DATED : April 27, 1976
INVENTOR(S) : Winston G. Rockefeller It is certified that error appears in the above-identified patent and that said Letters Patent are hereby corrected as shown below:

Column 1, line 57, change "plant" to --plan--.

Column 4, line 40, change "fo" to --of--.

Column 4, line 46, after "edge" insert --in--.

Column 5, line 57, change "rectuangular" to --rectangular--

Column 5, line 66, change "of the body" to --of tube body--.

Column 6, line 14 insert "of" after --surface--.

Column 6, line 40 change "axix" to --axis--.

Column 7, line 47, change "times" to --timed--.

Column 7, line 66 change "adacent" to --adjacent--.

Column 9, line 54 insert --head-- after "inner".

Column 11, line 35 change "mamber" to --member--.

Column 12, line 27 change "againt" to --against--.

Column 12, line 30 change "completly" to --completely--.

Column 13, line 13, change "is" to --as--.

Column 14, line 32 change "predermined" to -- predetermined --.

Column 15, line 8 delete "an" from --clamp an said--.

Signed and Sealed this

Thirteenth Day of July 1976

[SEAL]

Attest:

RUTH C. MASON
Attesting Officer

C. MARSHALL DANN
Commissioner of Patents and Trademarks